Nov. 23, 1954   C. F. FITZGERALD ET AL   2,694,820
CLAMPING MECHANISM

Filed March 23, 1951   3 Sheets-Sheet 1

Inventors
Charles F. Fitzgerald
Alfred C. D'Arcey
By their Attorney

Nov. 23, 1954  C. F. FITZGERALD ET AL  2,694,820
CLAMPING MECHANISM
Filed March 23, 1951  3 Sheets-Sheet 2

Inventors
Charles F. Fitzgerald
Alfred C. D'Arcey
By their Attorney

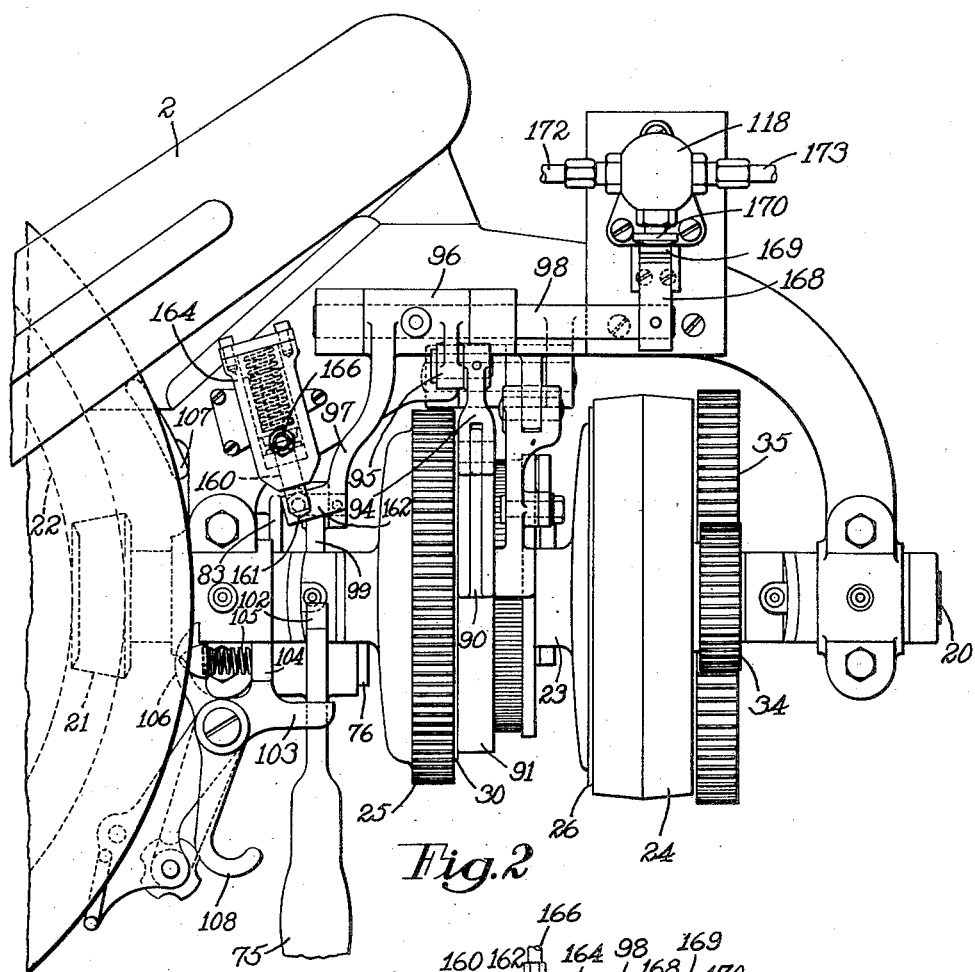

United States Patent Office 2,694,820
Patented Nov. 23, 1954

2,694,820

CLAMPING MECHANISM

Charles F. Fitzgerald, Beverly, and Alfred C. D'Arcey, Danvers, Mass., assignors to United Shoe Machinery Corporation, Flemington, N. J., a corporation of New Jersey Application March 23, 1951, Serial No. 217,214

4 Claims. (Cl. 12—86.65)

This invention relates to clamping mechanism and, more particularly, to a fluid-operated clamping mechanism of the type embodied in a sole rounding machine disclosed in United States Letters Patent No. 2,564,718, granted August 21, 1951, upon an application of Hans C. Paulsen.

In the use of earlier machines of this kind, that disclosed in the Eaton Patent No. 1,048,511, granted December 31, 1912, being a typical example, the work is held against a support or pattern by a clamping mechanism having a treadle upon which the operator is required to exert considerable foot pressure throughout the rounding operation. By the use of a fluid-operated clamping mechanism, such as that disclosed in the abovementioned Paulsen patent, the operator is relieved of this arduous work clamping operation, since merely by opening a valve, operated by a treadle, air pressure is admitted to a piston and cylinder which are arranged to set up the required clamping pressure. Air pressure of the amount needed to insure adequate clamping pressure causes the clamping action to take place rather suddenly, and with considerable force. From each of these properties of the clamping action there arises some hazard to the operator because he must be sure that the desired positioning of the work has been maintained up to the time when the work is held by the clamping means, and yet must have removed his hands from the field of action of the clamping means before the clamping action takes place.

In view of the foregoing, it is a general object of the invention to provide an improved fluid-operated clamping mechanism, adapted for use in a sole rounding machine or any other shoe machine in which the work is clamped while it is operated upon, which first causes preliminary clamping pressure to be applied to the work which is light enough not to endanger the operator nor to prevent the positioning of the work by the operator and yet is sufficient to hold the work where it is positioned, and then exerts a heavier clamping pressure sufficient to hold the work while it is being operated upon. Further objects of the invention are to insure that a rounding operation cannot be started until the required heavier clamping pressure is fully set up, and to minimize the possibility of injury to the operator from the heavier clamping pressure.

In view of the foregoing, and in accordance with one feature of the invention, there is employed in the illustrated machine a fluid-operated system for operating the movable clamp under such low pressure as to avoid endangering the operator when the initial clamping pressure upon the work is set up, a high-pressure fluid-operated system including a driving element for imparting the final clamping pressure to the work to which fluid pressure is released by operation of the usual starting member for actuating the knife driving mechanism, and means for normally preventing the operation of the starting member but operable, in response to the release of fluid pressure to the low pressure system, to permit the starting member to be operated.

The above mentioned low pressure system of the illustrated machine comprises a plunger of small displacement and associated with the movable clamp, whereby a small flow of fluid to the plunger causes a relatively rapid initial movement of the clamp into engagement with the work under a low and safe pressure. Moreover, since the high pressure system is actuated by the starting member, which is a hand operated element of the machine, at least one of the operator's hands must be removed from the work and clamp before the high pressure is applied. In practice, the necessity for moving one hand away from the clamp in order to apply the heavier pressure is a sufficient reminder to the operator that the other hand also should be removed from the clamp.

These and other features of the invention will now be described in greater detail with reference to the accompanying drawings, and will be defined in the claims.

In the drawings,

Fig. 2 is a plan view illustrating a part of the driving mechanism of the machine shown in Fig. 1, together with certain controls for the clamping mechanism which are associated with the driving mechanism;

Fig. 3 is an end elevation of a portion of the driving mechanism shown in Fig. 2 which is associated with the controls for the clamping mechanism;

Figure 1:
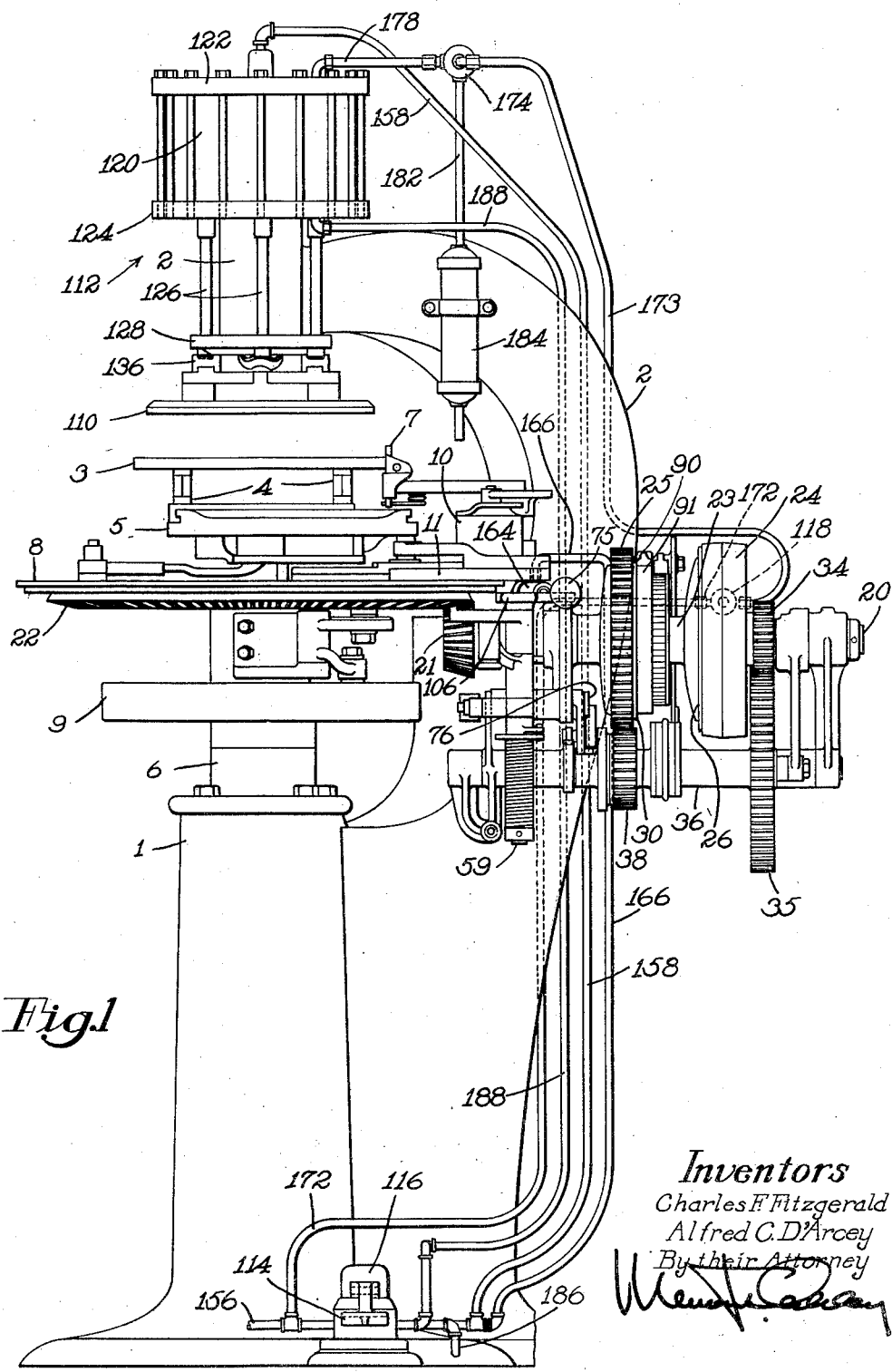
Fig. 1 is a front elevation of an illustrative machine having a fluid-operated clamping mechanism embodying the invention.
Figure 4:
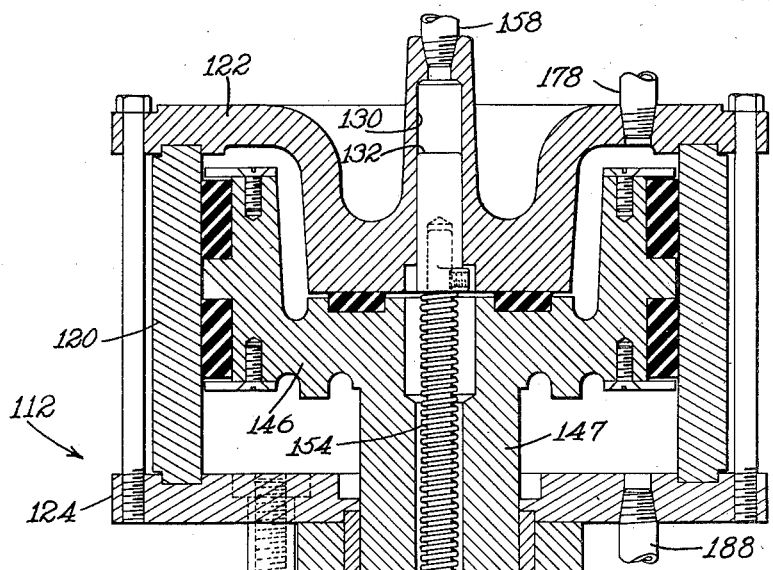
Fig. 4 is a sectional elevation of the pressure head which operates the clamp.

There will first be described briefly, and only to the extent necessary for an understanding of the present invention, various parts of the illustrated machine which are old and well-known and are substantially identical to the corresponding parts of the machines disclosed in the above-mentioned Eaton Patent 1,048,511, and the Benjamin F. Mayo Patent No. 882,009, granted on March 17, 1908, to which reference may be made for a more complete description of these parts. The machine has a frame consisting of a base 1 from which there extends upwardly an overhanging arm 2. A pattern 3 is mounted upon the upper ends of supports 4 which rise from a stationary cam block 5, the latter being fixed to the upper end of a cylindrical standard 6 bolted to the base 1. A knife 7 is transferred around the periphery of the pattern 3, under the guidance of its edge, by the rotation of a table 8 the hub of which rests upon the hub of a stationary cam 9 which is fixed upon the standard 6. The knife 7 is mounted upon a carrier 10 which is mounted to slide upon a guide 11 under the control of a cam in the block 5. The guide is pivoted upon the table 8 and is swung, during each circuit of the knife around the pattern, to maintain the desired tangential relation of the cutting force of the knife to the edge of the pattern by mechanism including the cam 9, as fully described in the Mayo patent.

The table 8 is driven to cause the knife to travel around the pattern through a driving shaft 20 having fixed upon its inner end a pinion 21 which meshes with a gear 22 secured to the lower side of the table. The driving shaft 20 is rotated by a driving member 23 which is fixed to the shaft between a driving pulley 24 and a driving gear 25. The driving member 23 is provided with flanges 26, 30 which are adjacent to the pulley 24 and gear 25, respectively. The pulley 24 and gear 25 are mounted to rotate freely upon the shaft 20, and also slide axially of the shaft together, so that driving engagement may be established either between the pulley 24 and the flange 26, or between the gear 25 and the flange 30. When the pulley and the flange 26 are in driving engagement the table 8 is driven at its higher speed. When the pulley 24 is disengaged from the flange 26 and the gear 25 is in driving engagement with the flange 30, the table 8 is driven at a low speed through other connections comprising a pinion 34 secured to the hub of the pulley 24 and meshing with a gear 35 which is fixed upon the outer end of a sleeve 36, the inner end of this sleeve carrying a pinion 38 which meshes with the gear 25.

The driving mechanism is actuated to initiate a movement of the knife around the pattern by swinging a starting handle 75 downwardly; and such action of the starting handle causes the driving pulley 24 to be engaged with the flange 26 through connections which are fully disclosed in the above-mentioned Eaton patent. The starting handle is pivoted upon a fixed stud 76 and is held in its normal inoperative position, as illustrated in Fig. 3, by the action of a spring 79 which is connected with the handle through a rod 80 having a hook 81 at its upper end arranged to engage a roller stud 82 mounted upon the rear end of an arm 83 which projects rearwardly from the hub of the starting handle.

Also when the starting member is in its inoperative position, the spring 79 acts to hold a brake shoe 90 in engagement with a brake drum 91 formed on the driving member 23 adjacent to the flange 30. This brake shoe is connected by a link 94 to an arm 95 which projects from the hub 96 of a lever 97. This lever is secured to a rock shaft 98 and is connected at its free end to one end of a link 99, the other end of which is pivotally connected at 100 with an arm 101 which projects from the hub of the starting member 75.

When the driving mechanism is to be thrown into action the starting member 75 is swung downward until an arm 102, which projects from the upper side of the starting member, passes under and into engagement with the lower side of a latch arm 103. This latch arm is loosely pivoted upon the upper end of a rock shaft 59 and is held against a stop 104 by a spring 105 which is interposed between the stop and an arm 106 which projects from the hub of the latch arm. The arm 106 lies within the path of a cam 107 adjustably secured to the table 8 and when, after the knife 7 nears the end of one revolution around the pattern, the cam 107 engages the arm 106, the latch arm 103 is moved forwardly off the arm 102 of the starting member with the result that the latter is returned to its inoperative position, and the driving mechanism is disengaged. The latch 103 may be manually operated at any time to release the starting member 75 by means of a handle 108 which projects forwardly from the latch arm 103.

Having described such of the well-known features of the illustrated machine as are related to the novel structure provided by this invention, the following description of the machine will be concerned with the fluid-operated clamping mechanism and its relation to the knife driving mechanism.

A clamp 110 is mounted above the pattern 3 upon a pressure head 112 which is fixed to the end of the overhanging arm 2 so that the clamp is alined with the pattern. The pressure head is so constructed and connected with a supply of fluid pressure as to cause the clamp 110 to be lowered quickly under a relatively light pressure into engagement with a work piece on the pattern 3 in response to the depression of a treadle 114 associated with a valve 116 fixed to the lower part of the base 1. This preliminary clamping pressure, while light enough to allow the operator to adjust the work piece into the desired position with respect to the pattern 3 and to avoid harming the operator's fingers if they have not been removed from beneath the clamp before the clamping action takes place, is sufficient to hold the work, where it is positioned, against the lateral pressure of the knife which may bear yieldingly against the work piece at this time. After the work has been properly positioned on the pattern, the operator next depresses the starting member 75 to engage the knife driving mechanism. However, before the driving mechanism is engaged a second valve 118 is operated, in response to the initial movement of the starting member, to cause the pressure head to hold the clamp 110 with a greatly increased pressure against the work, this pressure being maintained throughout the rounding operation. This final clamping pressure is sufficient to insure against any movement of the work between the pattern and the clamp while the work is being trimmed by the knife 7. When the trimming operation has been completed, the starting member 75 is automatically released by the latch arm 103, as described above, and the valve 118 cuts off the supply of fluid pressure to the pressure head. The operator now releases the treadle 114 which causes the pressure head to retract the clamp 110 from the work.

The pressure head 112 comprises a cylinder 120 the top and bottom of which are closed by covers 122, 124, the latter being seated upon the arm 2. A series of bolts 126 connect the cover 124 with a plate 128 to clamp the pressure head upon the arm 2. The cover 122 is provided with a cylindrical bore 130 in which a piston 132 is arranged to slide vertically. This piston is fixed upon and is effectually a part of a plunger 134 the lower end of which is bifurcated to receive a crossbar 136 upon which the clamp 110 is mounted in the usual manner. The crossbar is provided with an arcuate slot 138 in each side, these slots being arranged to receive blocks 140, each block being supported upon a bolt 142 fixed to the lower end of the plunger. This construction permits the clamp 110 to swing freely into parallelism with the upper surface of the work. A yielding detent 144 arranged to seat within a notch in the crossbar normally holds the latter in a horizontal position.

Mounted for movement vertically within the cylinder 120 is a piston 146 having a shank 147 which is bored to receive the plunger 134, and slides within a tube 148 which is fixed to the lower cover 124. The tube is slotted to receive a key 149 which is held in a keyway 150 in the arm 2 by a screw 151. The key also fits within a keyway 152 cut in the shank 147 to prevent the latter from turning and to keep the clamp 110 in alinement with the pattern 3. A spring 154 coiled about the plunger 134 is compressed between the piston 132 and the shank 147, and urges the plunger upwardly with respect to the piston 146.

Figure 5:
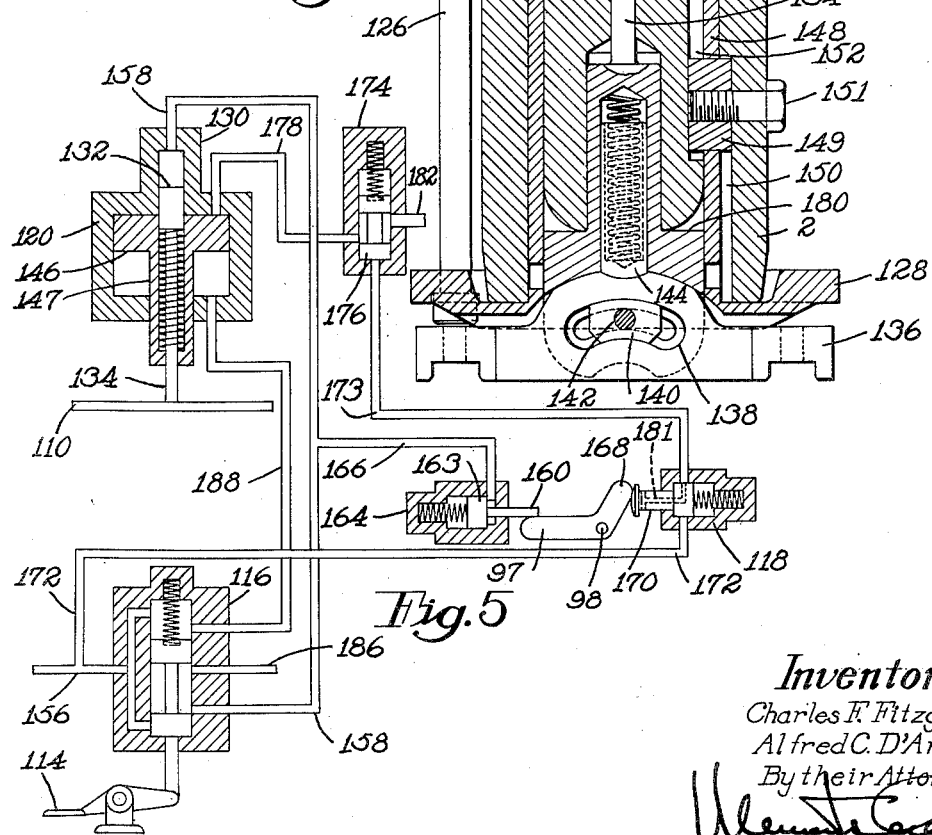
Fig. 5 is a diagrammatical view showing the principal elements of the fluid-operated clamping mechanism, their relation to the driving mechanism, and the connections between these elements.

When the operator depresses the treadle 114 from its normal position as illustrated in Fig. 5, fluid pressure supplied to the valve 116 through a pipe 156 is conducted through another pipe 158 to the cylinder 130 and piston 132, causing the plunger 134 to be lowered and the pattern 110 to be brought into engagement with the work. This movement of the pattern takes place quickly because of the small displacement of the piston 132 and, because of the small area of the end of the piston, this preliminary clamping pressure is light enough to permit the work to be shifted between the pattern and the clamp into the desired relation with respect to the pattern. This preliminary pressure is also so light that it may bear fully upon the operator's fingers without harm to them if they happen to be caught between the clamp and the pattern or the work at this time.

It is impossible to operate the starting member 75 until the treadle 114 has been operated to set up the preliminary clamping pressure owing to the provision of a stop 160 which normally overlies a screw 161 threaded into a projection 162 integral with the above-mentioned lever 97. This stop extends from a spring-pressed plunger 163 mounted to slide within a casing 164 into which fluid pressure is directed by a pipe 166 which is tapped into the pipe 158, so that after the treadle 114 has been lowered to set up the preliminary clamping pressure the stop 160 is retracted out of the path of the screw 161, whereupon the starting member 75 is no longer prevented from being operated to engage the driving mechanism.

Assuming that a work piece has been properly positioned upon the pattern under the preliminary clamping pressure, the operator will next depress the starting member 75. This operation requires that the operator remove his right hand from the vicinity of the knife and the pattern, and is a sufficient reminder to the operator that his other hand also should be moved away from the clamp and the path of the knife before the final clamping pressure is applied or the rounding operation is begun. The first part of the downward movement of the starting member 75 is utilized to set up the final clamping pressure before the driving mechanism is engaged. To this end, a cam lever 168 fixed to the shaft 98 operates, through a hinged striker 169, a spring-pressed plunger 170 arranged to slide within the valve 118 so as to release fluid pressure to the cylinder 120. Fluid pressure is supplied to the valve 118 by a pipe 172 which is tapped into the pipe 156. Another pipe 173 connects the valve 118 with a by-pass valve 174 having a spring-pressed plunger 176 which, when it yields in response to fluid-pressure, allows the latter to pass through another pipe 178 opening into the cylinder 120 through the cover 122.

The piston 146 is now lowered to bring the lower end of its shank 147 into engagement with a shoulder 180 on the lower end of the plunger 134. From this time on, a relatively heavy pressure is applied to the work owing to the considerable area of the piston 146 which is presented to the fluid pressure in the upper part of the cylinder 120. The work is now so firmly held between the pattern 3 and the clamp 110 that it cannot be moved either by the operator or by the thrust of the knife exerted upon it during the rounding operation. The above described action of the pressure head takes place so rapidly that it is completed during the first few degrees of movement of the starting member 75. Continued downward movement of the starting member causes engagement of the flange 26 with the pulley 24, as described above, to initiate a cycle of operation of the knife driving mechanism, during which the starting member is held in its operative position by the latch arm 103.

Near the end of a complete revolution of the table 8 the cam 107 engages the arm 106, causing the latch arm 103 to be moved off the arm 102 of the starting member which immediately returns to its original position, as illustrated in Fig. 3, under the influence of the spring 79. Such movement of the starting member causes the cam lever 168 to release the plunger 170 so as to cut off the supply of fluid pressure to the upper part of the cylinder 120. When this occurs the fluid pressure in the pipe 173 is exhausted to the open air through a vent 181 in the plunger 170 and the plunger 176 in the by-pass valve 174 returns to its exhaust position, causing the upper part of the cylinder 120 to be exhausted through the pipe 178 and another pipe 182 which leads from the valve 174 to the open air through a muffler 184.

The rounding knife 7 now having come to rest again, and the heavier clamping pressure of the clamp 110 having been relieved, the operator next removes his foot from the treadle 114, permitting the latter to rise into its inoperative position. The porting arrangement of the valve 116 is such that at this time both the low pressure cylinder 130 and the casing 164 are exhausted into the open air through the pipes 158 and 166, and another pipe 186 projecting from the valve 116. Accordingly, no resistance is now presented to upward movement of the clamp 110, and the plunger 163 moves outwardly of the casing 164 to bring the stop 160 directly over the screw 161. Accidental operation of the starting member is thus prevented until the succeeding work piece to be operated upon has received the preliminary clamping pressure.

The clamp 110 is quickly lifted to its inoperative position, when the treadle 114 is released by the operator, by fluid pressure within the lower part of the cylinder 120, such pressure being supplied through a pipe 188 which is threaded into the cover 124, and is connected to the valve 116. It will also be understood by reference to Fig. 5 that the porting arrangement of the valve 116 permits the lower part of the cylinder 120 to be exhausted to the open air through the pipes 188 and 186 when the treadle 114 is lowered to set up the preliminary clamping pressure.

Having described our invention, what we claim as new and desire to protect by Letters Patent of the United States is:

1. In a shoe machine having clamping means for holding a shoe part, an operating tool, and driving mechanism for causing relative movement of said clamping means and tool whereby the point of operation of the tool is transferred around the shoe part, the combination of a fluid-operated pressure system comprising a member connected to said clamping means for applying pressure therethrough to the shoe part, a driving element for applying an augmented pressure to said clamping means, an operator controlled starting member for actuating said driving mechanism, a fluid-operated stop arranged normally to prevent operation of said starting member, operator controlled means for releasing fluid pressure to said member and stop whereby clamping pressure is applied to the shoe part and said stop is rendered inoperative, respectively, and connections operated by said starting member for releasing fluid pressure to said driving element and initiating a cycle of operation of said driving mechanism.

2. In a shoe machine having a work support, a clamp, fluid-operated means for holding said clamp against a work piece on said support, said means comprising a plunger on which said clamp is mounted, and a piston movable into driving engagement with said plunger to increase the clamping pressure, an operating tool, tool driving mechanism comprising an operator-controlled starting member constructed and arranged successively to release fluid-pressure to said piston and to actuate said driving mechanism, a fluid-operated stop normally preventing the operation of said starting member, and operator-controlled means for releasing fluid-pressure to said plunger and stop whereby an intial clamping pressure is applied to the work and said stop is operated to permit the operation of said starting member.

3. In a shoe machine having a work support, a clamp for holding a work piece against said support, an operating tool, and driving mechanism for operating said tool to cause its point of operation on the work to be transferred thereabout, the combination of fluid-operated means for operating said clamp to apply pressure to the shoe part, said means comprising a plunger connected to said clamp for applying pressure to the work piece and a piston cooperating with said plunger to apply additional pressure to said clamp and work piece, an operator controlled starting member for said driving mechanism, a fluid-operated stop for normally preventing the operation of said starting member, operator controlled means for releasing fluid pressure to said plunger and stop to cause said clamp to apply pressure to the work and to retract said stop, thus permitting movement of said starting member, and connections operated by said starting member for releasing fluid pressure to said piston and actuating said driving mechanism.

4. In a shoe machine having a work support, a clamp, fluid-operated means connected to said clamp for imparting clamping pressure therethrough to a work piece on said support, said fluid-operated means comprising a plunger and piston mounted for movement relative to each other in telescopic relation for applying initial and final pressures, respectively, to said clamp, an operating tool, tool driving mechanism, a starting member therefor, a fluid-operated stop normally biased to prevent movement of said starting member, an operator controlled member for releasing fluid pressure to said plunger and stop whereby initial clamping pressure is applied and said stop is retracted to permit operation of said starting member, and connections operated by said starting member for releasing fluid pressure to said piston and actuating said driving mechanism.

References Cited in the file of this patent

UNITED STATES PATENTS

| Number | Name | Date |
|---|---|---|
| 874,505 | Heys | Dec. 24, 1907 |
| 1,460,465 | Wood et al. | July 3, 1923 |
| 1,542,341 | Deckert | June 16, 1925 |
| 1,775,427 | Gregoire | Sept. 9, 1930 |
| 1,776,679 | Carroll | Sept. 23, 1930 |
| 2,564,718 | Paulsen | Aug. 21, 1951 |
| 2,569,226 | Carter | Sept. 25, 1951 |